United States Patent
Wu et al.

(10) Patent No.: US 7,324,564 B2
(45) Date of Patent: Jan. 29, 2008

(54) TRANSMITTING ODD-SIZED PACKETS OVER A DOUBLE DATA RATE LINK

(75) Inventors: Chia Y. Wu, Newark, CA (US); Walter T. Nixon, Fremont, CA (US); John D. Acton, Danville, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1078 days.

(21) Appl. No.: 10/369,795

(22) Filed: Feb. 20, 2003

(65) Prior Publication Data

US 2004/0165617 A1 Aug. 26, 2004

(51) Int. Cl.
*H04J 3/04* (2006.01)

(52) U.S. Cl. .................. 370/535; 370/230.1; 370/364; 370/474; 710/52; 710/310

(58) Field of Classification Search ........... 370/230, 370/230.1, 235, 282, 364, 366, 468, 474, 370/476, 535, 536, 537, 538, 542, 544; 710/52–54, 710/56, 305, 310
See application file for complete search history.

(56) References Cited

U.S. PATENT DOCUMENTS

| | | | |
|---|---|---|---|
| 5,689,646 A | 11/1997 | Thorson | 709/239 |
| 5,689,661 A | 11/1997 | Hayashi et al. | 710/316 |
| 5,701,416 A | 12/1997 | Thorson et al. | 712/11 |
| 5,720,025 A | 2/1998 | Wilkes et al. | 714/6 |
| 5,737,628 A | 4/1998 | Birrittella et al. | 712/11 |
| 5,970,232 A | 10/1999 | Passint et al. | 709/238 |
| 6,016,510 A | 1/2000 | Quattromani et al. | 709/233 |
| 6,023,753 A | 2/2000 | Pechanek et al. | 712/18 |
| 6,055,618 A | 4/2000 | Thorson | 712/11 |
| 6,101,181 A | 8/2000 | Passint et al. | 709/233 |
| 6,167,502 A | 12/2000 | Pechanek et al. | 712/15 |

(Continued)

FOREIGN PATENT DOCUMENTS

EP 0 785 512 7/1997

(Continued)

OTHER PUBLICATIONS

Kim, C.H. et al., "A 64-Mbit, 640-MByte/s Bidirectional Data Strobed, Double-Data-Rate SDRAM With a 40-mW DLL for a 256-MByte Memory System," IEEE Journal on Solid-State Circuits, Nov. 1998. vol. 33, iss. 11, pp. 1703-1710.*

(Continued)

*Primary Examiner*—Chi Pham
*Assistant Examiner*—Donald L Mills
(74) *Attorney, Agent, or Firm*—Robert C. Kowert; Meyertons, Hood, Kivlin, Kowert & Goetzel, P.C.

(57) ABSTRACT

A method may involve: receiving an even number of odd-sized packets for transmission over a double data rate link; re-packetizing the even number of odd-sized packets into several even-sized packets; transmitting the even-sized packets over the double data rate link; and de-packetizing the even-sized packets to reform the even number of odd-sized packets. Re-packetizing may involve dividing each of the even number of odd-sized packets into an even-sized portion and a remaining portion. Each even-sized portion may be transferred as one of the even-sized packets. The remaining portions of each of the even number of odd-sized packets may be combined to form another one of even-sized packets. De-packetizing may involve associating each of several portions of one of the even-sized packets with a respective other one of the even-sized packets.

27 Claims, 5 Drawing Sheets

U.S. PATENT DOCUMENTS

| | | | | |
|---|---|---|---|---|
| 6,337,830 | B1 | 1/2002 | Faue | 365/230.04 |
| 6,356,544 | B1 * | 3/2002 | O'Connor | 370/353 |
| 6,741,562 | B1 * | 5/2004 | Keirouz et al. | 370/230 |
| 6,854,117 | B1 * | 2/2005 | Roberts | 718/102 |
| 2003/0095559 | A1 * | 5/2003 | Sano et al. | 370/419 |
| 2003/0165158 | A1 * | 9/2003 | Davies et al. | 370/465 |
| 2004/0090920 | A1 * | 5/2004 | Wang | 370/241 |

FOREIGN PATENT DOCUMENTS

| | | |
|---|---|---|
| EP | 1420409 A2 * | 5/2004 |
| WO | 99/26429 | 5/1999 |

OTHER PUBLICATIONS

Bradley Kuszmaul, Mercury Computer Systems, Inc., "The RACE Network Architecture," (posted at www.mc.com/techlit/#tech_brief prior to this), 6 pages.

R.Y. Wang, T.E. Anderson and D.A. Patterson, "Virtual Log Based File Systems For a Programmable Disk," Proc. Third Symposium on Operating Systems Design and Implementation, Feb. 1999 (Also appeared as University of California Technical Report CSD-98-1031, 16 pages.

Prasant Mohapatra, Wormhole Routing Techniques for Directly Connected Multicomputer Systems, ACM Computing Surveys, vol. 30, No. 3, Sep. 1998, 37 pages.

Christopher Glass and Lionel Ni, "The Turn Model for Adaptive Routing," Journal of the Association for Computing Machinery, vol. 41, No. 5, Sep. 1994, pp. 874-902.

Reddy, Dept. of Computer & Information Sciences, "A Dynamically Reconfigurable WDM LAN Based on Reconfigurable Circulant Graph," IEEE, 1996, 4 pages.

Various Abstracts beginning with Funahashi, Jouraku and Amano, "Adaptive Routing for Recursive Diagonal Torus," Transactions of the Institute of Electronics, Information and Communication Engineers D-I, vol. J83D-I, No. 11, Nov. 2000, pp. 1143-1153.

Milan Kovacevic, Center for Telecommunications Research, "On Torus Topologies with Random Extra Links," IEEE 1996, pp. 410-418.

Dally, et al., The Torus Routing Chip, Distributed Computing, Springer-Verlag 1986, pp. 187-196.

Susan Hinrichs, "A Compile Time Model for Composing Parallel Programs," IEEE Parallel and Distributed Technology, 1995, 19 pages.

"CRAY T3D System Architecture Overview Manual," ftp://ftp.cray.com/product-info/mpp/T3D_Architecture_Over/T3D.overview.html, Cray Research, 1993, 40 pages.

Marco Fillo, et al., "The M-Machine Multicomputer," Laboratory for Computer Science, Massachusetts Institute of Technology, A.I. Memo No. 1532, Ann Arbor,. Mar. 1995, 14 pages.

Noakes, et al., "The J-Machine Multicomputer: An Architectural Evaluation," Proceedings of the 20th International Symposium on Computer Architecture, May 1993, 12 pages.

Dally, et al., "Architecture of a Message-Driven Processor," International Conference on Computer Architecture, Jun. 1987, pp. 189-196.

Dennison, Lee and Dally, "High-Performance Bidirectional Signalling in VLSI," Massachusetts Institute of Technology, Oct. 12, 1992, 20 pages.

Dally, et al., "Architecture and Implementation of the Reliable Router," Mass. Institute of Technology, Proceedings of Hot Interconnects II, Stanford CA, Aug. 1994, 12 pages.

Dally, et al., "The Reliable Router: A Reliable and High-Performance Communication Substrate for Parallel Computers," Proceedings of the First International Parallel Computer Routing and Communication Workshop, Seattle WA, May 1994, 15 pages.

Dennison, et al., "Low-Latency Plesiochronous Data Retiming," Mass. Institute of Technology, Proceedings of the 1995 Advanced Research in VLSI Conference, Chapel Hill NC, Mar. 1995, 12 pages.

Whay S. Lee, "Mechanism for Efficient, Protected Messaging," Massachusetts Institute of Technology, Dept. of Electrical Engineering and Computer Science, Jan. 20, 1999, 147 pages.

Dennison, "Reliable Interconnect Networks for Parallel Computers," Mass. Institute of Technology, Dept. of Electrical Engineering and Computer Science, Apr. 18, 1991, 79 pages.

Thucydides Xanthopoulos, "Fault Tolerant Adaptive Routing in Multicomputer Networks," Dept. of Electrical Engineering and Computer Science , Mass. Institute of Technology, Jan. 20, 1995, 152 pages.

Dennison, "The Reliable Router: An Architecture for Fault Tolerant Interconnect," Dept. of Electrical Engineering and Computer Science, Mass Institute of Technology, May 24, 1996, 145 pages.

"Introduction To Parallel Algorithms and Architectures: Arrays, Trees, Hypercubes," F. Thomson Leighton, Morgan Kaufmann Publishers, 1992, pp. 1-831.

Christopher J. Glass and Lionel Ni, "Fault-Tolerant Wormhole Routing in Meshes," Technical Report, MSU-CPS-ACS-72, Oct. 30, 1992 (revised May 25, 1993), 28 pages.

Stefan Savage and John Wilkes, "AFRAID-A Frequently Redundant Array of Independent Disks," Proceedings of the 1996 USENIX Technical Conference, pp. 27-39, San Diego, CA, Jan. 1996, 13 pages.

Steve Ward, et al., "A Modular, Scalable Communications Substrate," MIT Laboratory for Computer Science, Jul. 1993, 10 pages.

Christopher Glass and Lionel Ni, "The Turn Model for Adaptive Routing," Technical Reports, MSU-CPS-ACS-44, Oct. 10, 1991 (revised Mar. 2, 1992), pp. 278-287 (numbered herein as 1-20).

Thomas Stricker, "Message Routing on Irregular 2D-Meshes and Tori," School of Computer Science, Carnegie Mellon Univ., Jan. 15, 1991, pp. 170-177 (numbered herein as 1-19).

Dally, et al., "The J-Machine: A Restrospective," in 25 Years of the International Symposia on Computer Architecture-Selected Papers. pp. 54-58.

* cited by examiner

TRANSMITTING ODD-SIZED PACKETS OVER A DOUBLE DATA RATE LINK

BACKGROUND

1. Field of the Invention

This invention relates to data transmission and, more particularly, to transmitting data over a double data rate link.

2. Description of the Related Art

Double data rate links are becoming increasingly popular. On a double data rate link, data is transferred on both the rising and falling edges of a clock. As a result, the rate of data transmission may be effectively doubled compared to prior links, which typically receive data on either the rising or the falling edge of a clock in the receiver. Some double data rate links are source-synchronous links (also referred to as clock forwarding links), which transmit a clock signal in addition to data. Because the transmit clock is sent along with the data, the transmit clock remains in phase with the data as both propagate to the receiver. This in turn allows very high-speed data recovery at the receiver, minimizing errors due to set-up and hold violations.

Typically, even-sized data packets are transmitted over a double data rate link. For example, a double data rate link may include eight data lines and one clock line. Each clock edge, a new byte of data may be transferred over the link. Bytes within a word-sized packet may be transmitted over the link in the sequence byte 0-byte 7. If byte 0 is transmitted on the rising edge of the clock, bytes 0, 2, 4, and 6 may be transferred on rising edges and bytes 1, 3, 5, and 7 may be transferred on falling edges. Since the final byte in the packet is transmitted on the falling edge of the transmit clock, subsequently transferred packets will also have even bytes on rising edges and odd bytes on falling edges. Accordingly, a receiver may easily synchronize data packets to particular edges of the transmit clock.

When odd-sized data packets are transferred over a double data rate link, the clock edge on which a particular byte is received may vary from packet to packet. For example, if nine bytes are included in each packet, byte 0 of successive packets will be transferred on alternating even and odd transmit clock edges. For example, bytes 0, 2, 4, 6, and 8 of a first packet may be transferred on rising clock edges. Bytes 1, 3, 5, and 7 of that packet may be transferred on falling clock edges. Since the final byte of the packet is transferred on a rising clock edge, the first byte of the next packet will be transferred on a falling clock edge. Since each packet may begin on a different clock edge than the previous packet, receiver logic may be undesirably complex.

SUMMARY

Various embodiments of systems and methods for transmitting odd-sized packets over a double data rate link by sending a portion of the information included in each of several of the odd-sized packets as a separate packet are disclosed. In some embodiments, a method may involve: receiving an even number of odd-sized packets for transmission over a double data rate link; re-packetizing the even number of odd-sized packets into several even-sized packets; transmitting the even-sized packets over the double data rate link; and de-packetizing the even-sized packets to reform the even number of odd-sized packets. Re-packetizing may involve dividing each of the even number of odd-sized packets into an even-sized portion and a remaining portion. Each even-sized portion may be transferred as one of the even-sized packets. The remaining portions of each of the even number of odd-sized packets may be combined to form another one of even-sized packets. De-packetizing may involve associating each of several portions of one of the even-sized packets with a respective other one of the even-sized packets.

In other embodiments, a method may involve: receiving an odd-sized packet for transmission over a double data rate link; transmitting an even-sized portion of the odd-sized packet over the double data rate link; buffering a remaining portion of the odd-sized packet; repeating said receiving, said transmitting, and said buffering an even number of times; and subsequent to said repeating, transmitting over the double data rate link an even-sized packet comprising data buffered by repeatedly buffering the remaining portions of odd-sized packets. The remaining portion of the odd-sized packet may include error code information associated with the even-sized portion of the packet.

Embodiments of a system may include a double data rate link, a receiver coupled to receive data from the double data rate link, and a transmitter coupled to send data over the double data rate link. The transmitter may include core logic and a packetizer. The packetizer may be configured to receive an odd-sized packet from the core logic for transmission over the double data rate link. The packetizer may then transmit an even-sized portion of the odd-sized packet over the double data rate link and store an odd-sized remaining portion of the odd-sized packet in a buffer. In response to storing an even number of remaining portions in the buffer, the packetizer may be configured to send an even-sized packet comprising the remaining portions over the double data rate link.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
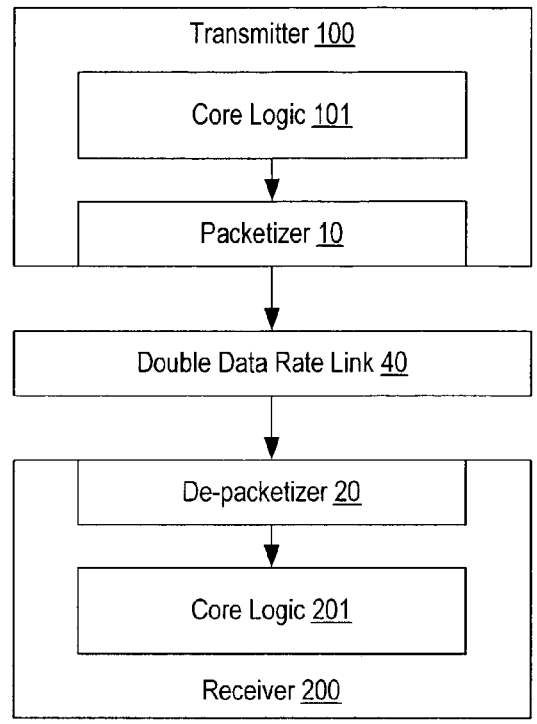
FIG. 1 illustrates a system that includes a transmitter configured to transmit odd-sized packets over a double data rate link, according to one embodiment.

FIG. 1 illustrates a system for transmitting data over a double data rate link, according to one embodiment. This system includes a transmitter 100 and a receiver 200 coupled by a double data rate link 40. The transmitter includes a packetizer 10, which is configured to receive odd-sized data packets from core logic 101 via an internal communication link. The packetizer 10 is configured to regroup the odd-sized data packets into even-sized packets for transmission over the double data rate link 40. A de-packetizer 20 included in the receiver 200 is configured to reassemble the odd-sized data packets from the even-sized packets received via the double data rate link 40 and to communicate the resulting odd-sized packets over an internal communication link to its core logic 201.

Transmitter 100 and receiver 200 may be included on a single board or card in some embodiments. In other embodiments, transmitter 100 and receiver 200 may be remote from each other. The transmitter 100 and receiver 200 may each be ASICs (Application Specific Integrated Circuits). For example, transmitter 100 and receiver 200 may each be ASICs included in a graphics subsystem, storage controller, or other subsystem. In another embodiment, transmitter 100 may include a microprocessor that generates packets and receiver 200 may include a DDR SDRAM (Double Data Rate Synchronous Dynamic Random Access Memory) chip that receives packets generated by the microprocessor.

In one embodiment, a device 101 within transmitter 100 may generate packets of data for transmission to a device 201 within receiver 200. Each packet of data may include a number of data units. As used herein, a "data unit" or "unit of data" is a uniformly-sized group of data such as a byte, word, block, etc. A data unit may, in many embodiments, be the amount of data that may be transferred in a single beat (i.e., clock edge) on double data rate link 40. In some embodiments, another device (e.g., a device configured to generate error codes) within transmitter 100 may receive the data packet and append one or more additional units of data to the packet. These additional data units may include error code information (e.g., checkbits generated according to an error correcting and/or error detecting code), parity information, tags identifying which devices within the transmitter have processed the associated packet, or any other information associated with the other data units in the packet. A receiving device 201 within receiver 200 may use the additional information to verify or otherwise process the other data units within the packet in some embodiments.

The data packet provided to packetizer 10 for transmission over the double data rate link may be odd-sized (i.e., the packet may include an odd number of data units). This odd-size may arise due to core logic 101 generating an odd-sized packet or due to the addition of an odd-sized number of additional data units to an even-sized packet generated by core logic 101.

Figure 2:
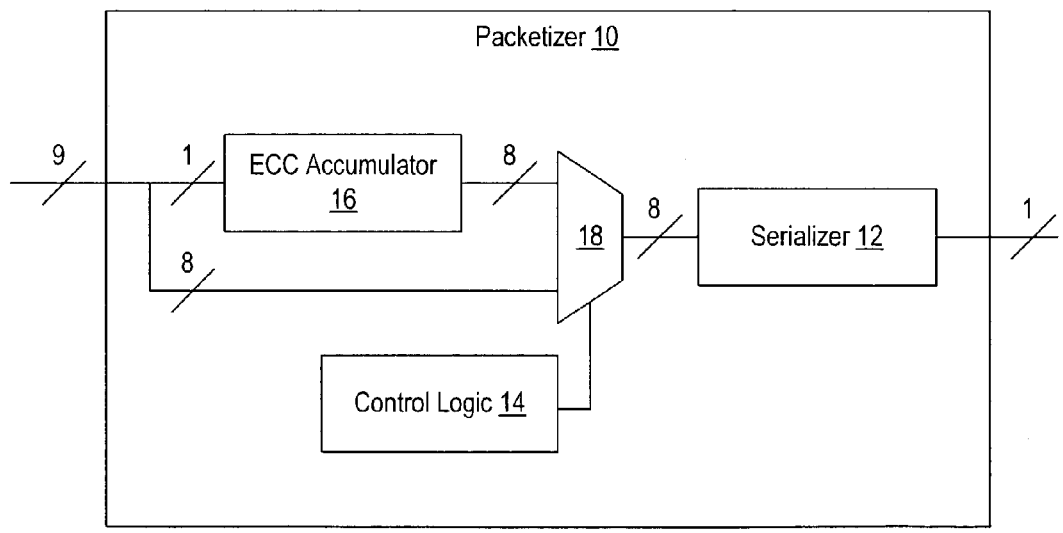
FIG. 2 is a block diagram of a packetizer, according to one embodiment.

FIG. 2 shows a block diagram of a packetizer 10 configured to transmit odd-sized packets over a double data rate link by regrouping the odd-sized packets into even-sized packets, according to one embodiment. In this embodiment, packetizer 10 is configured to receive nine-byte packets from a communication link within transmitter 100 and to transfer eight-byte packets over double data rate link 40. Packetizer 10 may receive each byte in a nine-byte packet in parallel in a single clock cycle in one embodiment. In other embodiments, each byte in a nine-byte packet may be received serially. Each nine-byte packet includes eight bytes of data and one byte of associated ECC (Error Correcting Code) information. Packetizer 10 may regroup an even number of odd-sized packets into even-sized packets for transmission over double data rate link 40. One byte of data may be transferred over double data rate link 40 each beat (e.g., each rising and/or falling edge of the transmit clock sent over the link). Note that these packets are merely used as an example and that packets having differing numbers, types, and sizes of data units may be transferred within transmitter 100 and/or over double data rate link 40.

In this embodiment, packetizer 10 includes control logic 14, ECC accumulator 16, multiplexer 18, and serializer 12. As each nine-byte packet is received from another device within transmitter 100, the ECC byte is stored in ECC accumulator 16. Control logic 14 may control multiplexer 18 so that the eight non-ECC bytes are provided directly to serializer 12. Serializer 12 may then transmit the eight non-ECC bytes as a single packet by sending one of the eight non-ECC bytes over the double data rate link 40 each beat. Serializer 12 may transmit the bytes over the double data rate link sequentially (e.g., byte 0, byte 1, . . . byte 7) in one embodiment.

Once an even number (e.g., eight) of ECC bytes from an even number of nine-byte packets have been accumulated, control logic 14 may control multiplexer 18 to provide the even-sized packet from the ECC accumulator 16 to serializer 12. Serializer 12 may then transmit the even-sized packet over the double data rate link 40. In many embodiments, the serializer 12 may transmit the ECC bytes included in the even-sized ECC packet in the same order as which the ECC bytes' associated data packets were transferred over the double data rate link 40.

Figure 3:
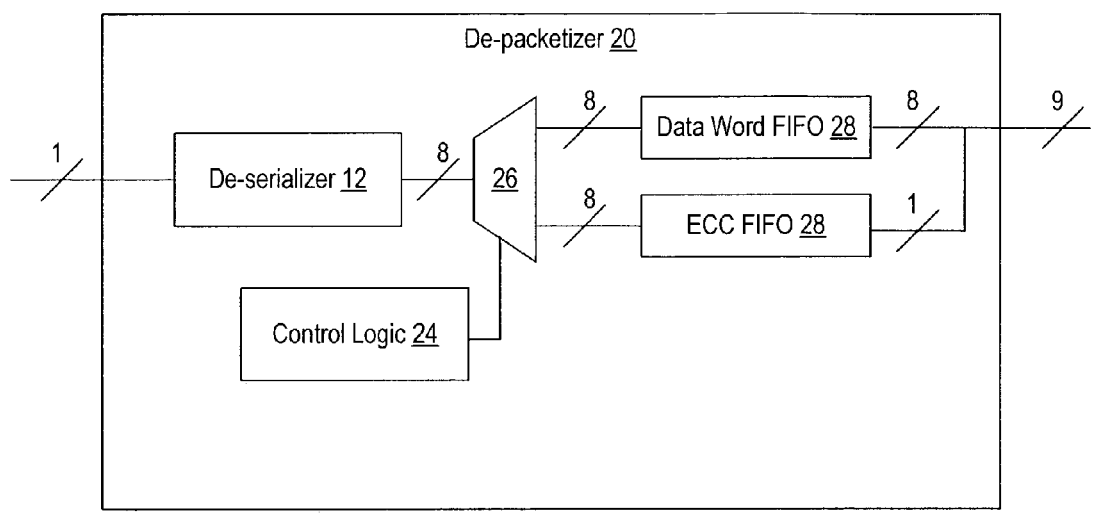
FIG. 3 is a block diagram of a de-packetizer, according to one embodiment.

FIG. 3 shows a block diagram of a de-packetizer 20, according to one embodiment. In this embodiment, de-packetizer 20 is configured to receive eight-byte packets over double data rate link 40 and to reassemble nine-byte packets from accumulated eight-byte packets for transfer within receiver 200. Each nine-byte packet may include eight data bytes and one byte of associated ECC information. As with the packetizer shown in FIG. 2, these packets are merely exemplary. Other embodiments may transfer packets having differing numbers, types, and sizes of data units both within receiver 200 and over double data rate link 40.

In this embodiment, de-packetizer 20 includes de-serializer 22, demultiplexer 26, data word FIFO (First In, First Out) queue 28, ECC word FIFO 30, and control logic 24. De-serializer 22 receives eight-byte packets from double data rate link 40. One byte may be received each beat on double data rate link 40. Depending on whether the currently received packet is a data packet or an ECC packet, control logic 24 controls demultiplexer 26 to store data packets in data word FIFO 28 and ECC words in ECC word FIFO 30. Upon receiving an ECC word, the de-packetizer 20 may reassemble nine-byte packets from FIFOs 28 and 30 by selecting the data word and ECC byte at the head of each queue.

Note that in other embodiments, techniques other than FIFO buffering and in order transmission may be used to track which data packets each portion of an ECC packet is associated with. For example, a small amount of additional information may be added to each data packet and/or to each portion of an ECC packet identifying the original odd-sized packet in which that data was included.

As the exemplary data transfer system of FIGS. 1-3 shows, N odd-sized data packets to be transferred over a source-synchronous link may be regrouped into N+1 even-sized packets in which one even-sized packet includes portions of each of the N odd-sized packets. Upon receipt, each portion of that even-sized packet may be regrouped with an associated even-sized packet to reform the N odd-sized packets.

In some embodiments, the packetizer 10 and de-packetizer 20 may synchronize by respectively transmitting and receiving synchronization information. This synchronization information may, for example, be sent by the packetizer 10 to indicate when the next group of associated even-sized packets will begin. The de-packetizer may use this synchronization information when determining how to reassemble the odd-sized packets from the received even-sized packets. For example, in one embodiment, packetizer 10 may operate to transmit N−1 data packets over the double data rate link 40 followed by an ECC packet that includes ECC associated with each of the preceding N−1 data words. The packetizer 10 may provide synchronization information to the de-packetizer indicating which when the first of the N−1 data words will be transmitted. The de-packetizer 20 may be programmed with information indicating N, and thus when the de-packetizer receives the synchronization information from the packetizer, the de-packetizer 20 may identify which of the N even-sized packets to store in ECC FIFO 30.

In one embodiment, packetizer 10 may provide synchronization information to the de-packetizer when idle packets are being transmitted over the double data rate link 40. Idle packets may be transmitted over the double data rate link 40 during initialization of the double data rate link and during periods in which there are no data words to be transmitted. Every N−1 idle packets may be followed by an ECC packet that includes ECC associated with those N−1 idle packets. The packetizer 10 may assert a signal line included in the double data rate link 40 during the first beat of each idle packet but not during the first beat of each ECC packet. Based on the state of that signal line, the de-packetizer 20 may detect ECC packets. For example, a missing-pulse detector in the de-packetizer 20 may identify the location of ECC packets within the data stream transmitted by the packetizer 10. Whenever an ECC packet is identified, the de-packetizer 20 may be configured to begin accumulating data packets on the first beat of the next packet sent on double data rate link 40. After N−1 data packets are accumulated, the de-packetizer 20 may store the next packet into ECC FIFO 30 and include a portion of that packet in each of N−1 odd-sized packets. If an idle packet is received on the first beat of the next packet sent after detection of an ECC packet, the de-packetizer may discard the idle packet and wait for detection of the next ECC packet.

Figure 4:
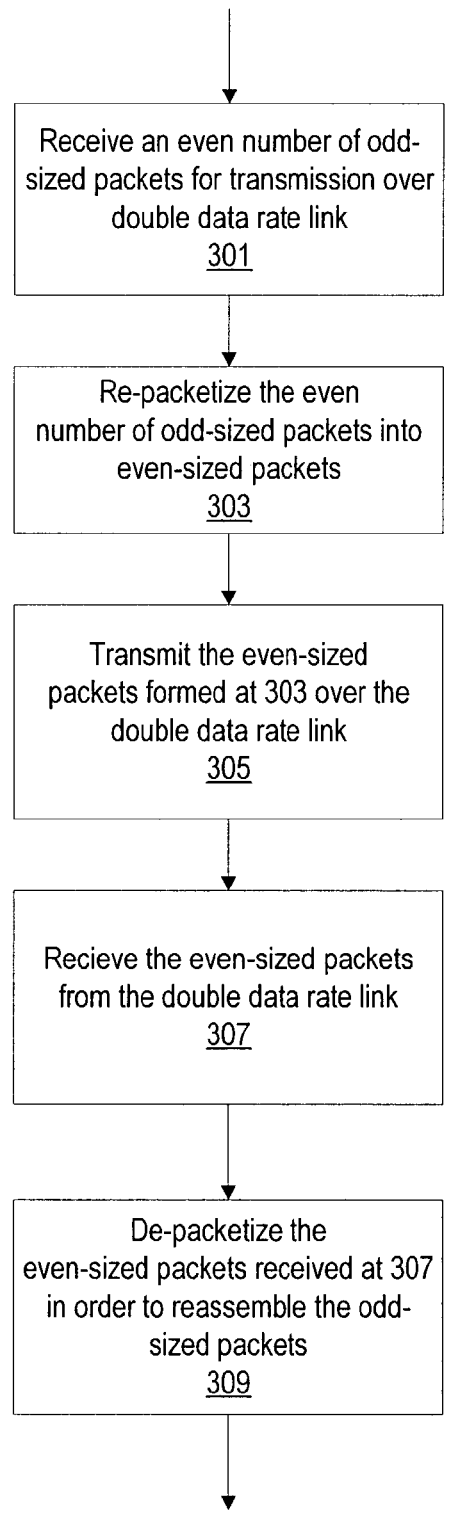
FIG. 4 illustrates a method of transferring even number of odd-sized packets over a double data rate link by re-packetizing the odd-sized packets into even-sized packets, according to one embodiment.

FIG. 4 illustrates one embodiment of a method of transferring odd-sized data packets over a double data rate link. At 301, an even number of odd-sized packets are received for transmission over a double data rate link. The even number of packets are then re-packetized into even-sized packets, as shown at 303. For example, an odd-sized portion (e.g., a byte) of each of the even number of odd-sized packets may be combined to form an even-sized packet. After subtracting the odd-sized portion, each of the even number of packets may be even-sized. Re-packetizing the even number of odd-sized packets may result in an odd number of even-sized packets. The re-packetized even-sized packets are then transmitted over the double data rate link, as shown at 305.

At 307, the even-sized packets are received from the double data rate link. The even-sized packets are then de-packetized to reassemble the original odd-sized packets, as indicated at 309. In one embodiment, the even-sized packets may be de-packetized by associating each portion of one even-sized packet with one of the other even-sized packets.

Figure 5:
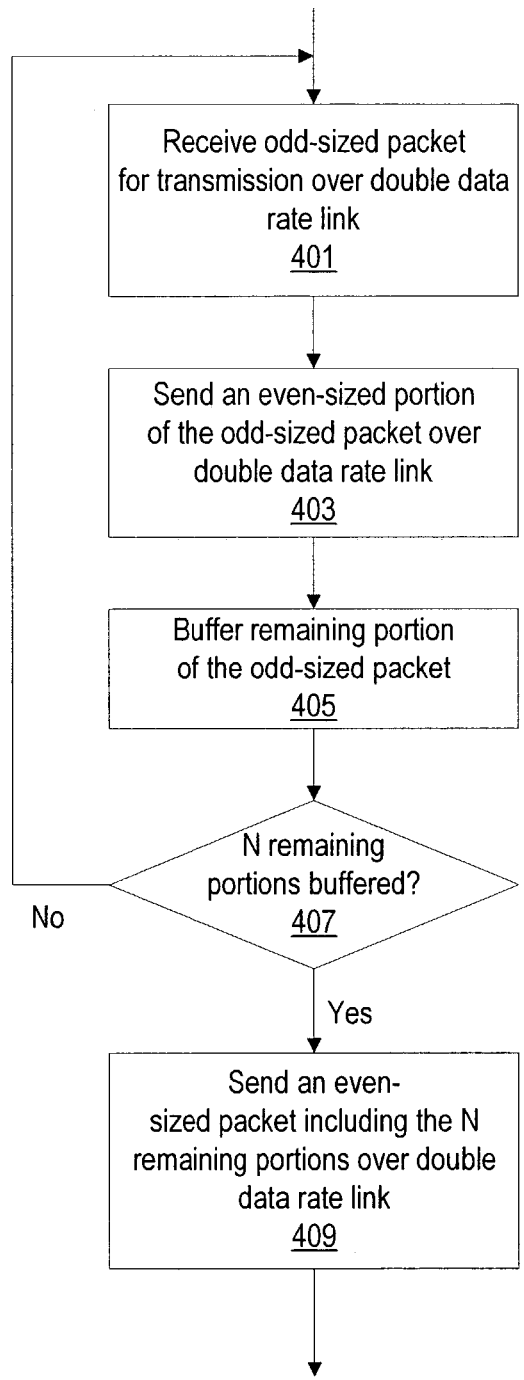
FIG. 5 illustrates a method of transmitting odd-sized packets over a double data rate link, according to one embodiment.

FIG. 5 is a flowchart of one embodiment of a method of sending odd-sized packets over a double data rate link by regrouping the odd-sized packets into even-sized packets. At 401, an odd-sized packet is received for transmission over a double data rate link. At 403, an even-sized portion of the odd-sized packet is transferred over the double data rate link. For example, if the odd-sized packet includes X+1 data units, where X is even, X of the data units may be transmitted over the double data rate link. The remaining portion of the odd-sized packet is buffered, as indicated at 405. For example, the remaining one of the X+1 data units from the previous example may be buffered for later transmission.

If an even number, here N, of remaining portions have been buffered, the remaining portions may be transferred over the double data rate link as an even-sized data packet, as indicated at 407-409. The even-sized packet of remaining portions sent at 409 may include the same number of data units as each even-sized packet sent at 403. Until the desired even number of remaining portions has been accumulated, additional odd-sized packets may be received and handled as shown at 401-405. In some embodiments, the even number N may equal the number of data units included in each even-sized packet transmitted over the double data rate link. However, these numbers may not be equal in other embodiments.

Figure 6:
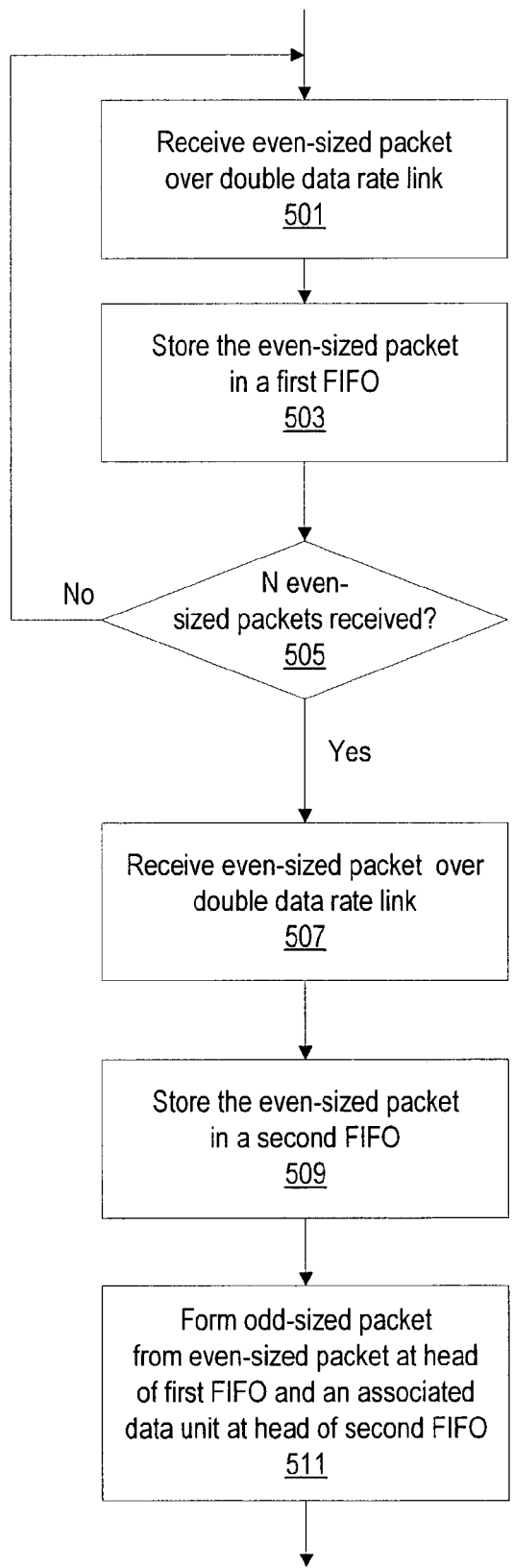
FIG. 6 illustrates a method of receiving odd-sized packets over a double data rate link, according to one embodiment.

FIG. 6 illustrates a method of receiving even-sized packets from a double data rate link and reassembling those packets into odd-sized packets. At 501, an even-sized packet is received from the double data rate link. This packet is stored in a first FIFO at 503. If a desired even number, here N, of packets have not yet been received, as determined at 505, the method may continue to handle packets as shown at 501-503. The particular even number N may depend on how odd-sized packets are regrouped in the transmitter. For example, every third even-sized packet sent on the double data rate link contains portions of each of two odd-sized data packets handled by the transmitter, N may equal two.

If the desired even number of packets have been received, the next even-sized packet received over the double data rate link may be stored in a different FIFO, as indicated at 507-509. An odd-sized packet may be reformed by grouping an even-sized packet from the head of the first FIFO with an associated portion of the even-sized packet stored in the other FIFO, as indicated at 511. The associated portion of the even-sized packet may be determined by the order of data units within the packet received at 507. For example, the first one of the N even-sized packets received when repeating 501-505 may be associated with the first data unit included in the packet received at 507.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
  receiving a plurality of data transmission units as an even number of odd-sized packets for transmission over a double data rate link, wherein each odd-sized packet has an odd number of data transmission units;

re-packetizing the plurality of data transmission units in the even number of odd-sized packets into a plurality of even-sized packets, wherein each even-sized packet has an even number of data transmission units, wherein the plurality of even-sized packets has a same number of data transmission units as the even number of odd-sized packets;

transmitting the plurality of even-sized packets over the double data rate link, wherein the data transmission units are transferred on both a rising edge and a falling edge of a clock for the double data rate link;

de-packetizing the plurality of even-sized packets to reform the even number of odd-sized packets.

2. The method of claim 1, wherein said re-packetizing comprises:

dividing each of the even number of odd-sized packets into an even-sized portion and a remaining portion, wherein each even-sized portion is one of the plurality of even-sized packets;

combining the remaining portion from each of the even number of odd-sized packets into another one of the plurality even-sized packets.

3. The method of claim 2, wherein the remaining portion of each of the even number of odd-sized packets comprises error code information associated with the even-sized portion of that packet.

4. The method of claim 1, wherein each odd-sized packet comprises an odd number of bytes.

5. The method of claim 1, wherein the number of data transmission units included in each of the plurality of even-sized packets equals the number of data transmission units included in each of the even number of odd-sized packets minus one.

6. The method of claim 1, wherein said de-packetizing comprises associating each of a plurality of portions included in one of the plurality of even-sized packets with a respective other one of the plurality of even-sized packets.

7. The method of claim 1, further comprising transmitting synchronization information over the double data rate link, wherein the synchronization information indicates a location of a next group of associated even-sized packets within a stream of packets being transmitted over the double data rate link.

8. A method, comprising:

receiving an odd-sized packet for transmission over a double data rate link, wherein the odd-sized packet has an odd number of data transmission units;

transmitting an even-sized portion of the odd-sized packet over the double data rate link, wherein the even-sized portion has an even number of data transmission units, wherein the data transmission units are transferred on both a rising edge and a falling edge of a clock for the double data rate link;

buffering a remaining portion of the odd-sized packet;

until said receiving, said transmitting, and said buffering are performed an even number of times, repeating said receiving, said transmitting, and said buffering;

subsequent to said repeating, transmitting over the double data rate link an even-sized packet comprising data buffered by performing said buffering the even number of times.

9. The method of claim 8, wherein the remaining portion of the odd-sized packet comprises error code information associated with the even-sized portion of the packet.

10. The method of claim 8, wherein said receiving comprises receiving an odd number of bytes.

11. The method of claim 8, wherein said transmitting an even-sized portion of the odd-sized packet over the double data rate link comprises transmitting one of an even number of bytes on each successive beat of a clock transmitted over the double data rate link.

12. The method of claim 8, wherein the number of data transmission units included in the even-sized packet equals the number of data transmission units included in the odd-sized packet minus one.

13. The method of claim 8, further comprising;

receiving the even-sized portion of the odd-sized packet from the double data rate link and responsively buffering the even-sized portion until receipt of the even-sized packet comprising data buffered by repeating said buffering; and reforming the odd-sized data packet by associating the even-sized portion of the odd-sized packet with the remaining portion of the odd-sized packet comprised in the even-sized packet.

14. The method of claim 8, further comprising receiving synchronization information over the double data rate link, wherein the synchronization information indicates a location of a next group of associated even-sized packets within a stream of packets being transmitted over the double data rate link.

15. A system, comprising:

a double data rate link;

a receiver coupled to receive data from the double data rate link, wherein the receiver is configured to receive data on both a rising edge and a falling edge of a clock for the double data rate link; and a transmitter coupled to send data over the double data rate link, wherein the transmitter includes core logic and a packetizer, wherein the transmitter is configured to transmit data on both a rising edge and a falling edge of the clock for the double data rate link;

wherein the packetizer is configured to receive an odd-sized packet from the core logic for transmission over the double data rate link, wherein the odd-sized packet has an odd number of data transmission units;

wherein the packetizer is configured to transmit an even-sized portion of the odd-sized packet over the double data rate link and to store an odd-sized remaining portion of the odd-sized packet in a buffer, wherein the even-sized portion has an even number of data transmission units, and wherein the odd-sized remaining portion has an odd-sized number of data transmission units;

wherein in response to storing an even number of remaining portions in the buffer, the packetizer is configured to send an even-sized packet comprising the remaining portions over the double data rate link, wherein the even-sized packet has an even number of data transmission units.

16. The system of claim 15, wherein the remaining portion of the odd-sized packet comprises error code information associated with the even-sized portion of the odd-sized packet.

17. The system of claim 15, wherein the odd-sized packet includes an odd number of bytes.

18. The system of claim 15, wherein the number of data transmission units included in the even-sized packet equals the number of data transmission units included in the odd-sized packet minus one.

19. The system of claim 15, wherein the receiver is configured to receive the even-sized portion of the odd-sized packet from the double data rate link and responsively buffer the even-sized portion until receipt of the even-sized packet, wherein the receiver is further configured to reform the odd-sized data packet by associating the even-sized portion of the odd-sized packet with the remaining portion of the odd-sized packet comprised in the even-sized packet.

20. The system of claim 15, wherein the packetizer is configured to transmit synchronization information over the double data rate link, wherein the synchronization information indicates a location of a next group of associated even-sized packets within a stream of packets being transmitted over the double data rate link.

21. A system, comprising:
a double data rate link configured to transfer data on both a rising edge and a falling edge of a clock for the double data rate link;
a packetizer coupled to send packets over the double data rate link, wherein the packetizer is configured to receive a plurality of data transmission units as an even number of odd-sized packets for transmission over the double data rate link, to packetize the even number of odd-sized packets into a plurality of even-sized packets, and to transmit the plurality of even-sized packets over the double data rate link, wherein each odd-sized packet has an odd number of data transmission units, wherein each even-sized packet has an even number of data transmission units, wherein the plurality of even-sized packets has a same number of data transmission units as the even number of odd-sized packets; and
a de-packetizer coupled to receive packets from the double data rate link, wherein the de-packetizer is configured to de-packetize the plurality of even-sized packets to reform the even number of odd-sized packets.

22. The system of claim 21, wherein the packetizer is configured to packetize the even number of odd-sized packets by:
dividing each of the even number of odd-sized packets into an even-sized portion and a remaining portion, wherein each even-sized portion is one of the plurality of even-sized packets; and
combining the remaining portion from each of the even number of odd-sized packets into another one of the plurality even-sized packets.

23. The system of claim 21, wherein the remaining portion of each of the even number of odd-sized packets comprises error code information associated with the even-sized portion of that packet.

24. The system of claim 21, wherein each odd-sized packet comprises an odd number of bytes.

25. The system of claim 21, wherein the number of data transmission units included in each of the plurality of even-sized packets equals the number of data transmission units included in each of the even number of odd-sized packets minus one.

26. The system of claim 21, wherein the de-packetizer is configured to de-packetize the plurality of even-sized packets by associating each of a plurality of portions included in one of the plurality of even-sized packets with a respective other one of the plurality of even-sized packets.

27. A system, comprising:
a double data rate link configured to transfer data on both a rising edge and a falling edge of a clock for the double data rate link; and
means for transmitting an even-sized portion of an odd-sized packet over the double data rate link and buffering a remaining portion of the odd-sized packet, wherein the odd-sized packet has an odd number of data transmission units, and wherein the even-sized portion has an even number of data transmission units;
wherein the means for transmitting is configured to repeatedly buffer remaining portions of odd-sized packets an even number of times and responsively transmit over the double data rate link an even-sized packet comprising data buffered by repeatedly buffering remaining portions, wherein the even-sized packet has an even number of data transmission units.

* * * * *